US008515097B2

(12) United States Patent
Nemer et al.

(10) Patent No.: US 8,515,097 B2

(45) Date of Patent: Aug. 20, 2013

(54) SINGLE MICROPHONE WIND NOISE SUPPRESSION

(75) Inventors: Elias Nemer, Irvine, CA (US); Wilfrid LeBlanc, Vancouver (CA); Mohammad Zad-Issa, Irvine, CA (US); Jes Thyssen, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1043 days.

(21) Appl. No.: 12/261,868

(22) Filed: Oct. 30, 2008

(65) Prior Publication Data

US 2010/0020986 A1 Jan. 28, 2010

Related U.S. Application Data

(60) Provisional application No. 61/083,725, filed on Jul. 25, 2008.

(51) Int. Cl.
*H04B 15/00* (2006.01)

(52) U.S. Cl.
USPC .......................... 381/94.1; 381/94.2; 704/219

(58) Field of Classification Search
USPC ............................... 381/94, 1, 94.2; 704/219
See application file for complete search history.

(56) References Cited

U.S. PATENT DOCUMENTS 5,012,517 A 4/1991 Wilson et al.
6,502,067 B1 12/2002 Hegger et al.
6,996,524 B2 2/2006 Gigi
2005/0143989 A1 6/2005 Jelinek
2006/0136203 A1 6/2006 Ichikawa
2006/0229869 A1 10/2006 Nemer
2007/0030989 A1 2/2007 Kates
2007/0136052 A1 6/2007 Gao et al.
2008/0281589 A1 11/2008 Wang et al.
2009/0129582 A1 5/2009 Chandran et al.
2010/0223054 A1 9/2010 Nemer et al.

OTHER PUBLICATIONS

Bradley, Stuart et al., "The Mechanisms Creating Wind Noise in Microphones", Audio Engineering Society (AES) 114th Convention, Amsterdam, the Netherlands, (Mar. 22-25, 2003), pp. 1-9.

Schmidt, Mikkel N., et al., "Wind Noise Reduction Using Non-Negative Sparse Coding", IEEE International Workshop on Machine Learning for Signal Processing, (2007), 6 pages.

*Primary Examiner* — Long Pham

(74) *Attorney, Agent, or Firm* — Fiala & Weaver P.L.L.C.

(57) ABSTRACT

A technique for suppressing non-stationary noise, such as wind noise, in an audio signal is described. In accordance with the technique, a series of frames of the audio signal is analyzed to detect whether the audio signal comprises non-stationary noise. If it is detected that the audio signal comprises non-stationary noise, a number of steps are performed. In accordance with these steps, a determination is made as to whether a frame of the audio signal comprises non-stationary noise or speech and non-stationary noise. If it is determined that the frame comprises non-stationary noise, a first filter is applied to the frame and if it is determined that the frame comprises speech and non-stationary noise, a second filter is applied to the frame.

28 Claims, 10 Drawing Sheets

SINGLE MICROPHONE WIND NOISE SUPPRESSION

CROSS-REFERENCE TO RELATED APPLICATIONS

This application claims priority to provisional U.S. Patent Application No. 61/083,725 filed Jul. 25, 2008, the entirety of which is incorporated by reference herein.

BACKGROUND OF THE INVENTION

1. Field of the Invention

The present invention generally relates to systems and methods for improving the perceptual quality of audio signals, such as speech signals transmitted between audio terminals in a telephony system.

2. Background

In a telephony system, an audio signal representing the voice of a speaker (also referred to as a speech signal) may be corrupted by acoustic noise present in the environment surrounding the speaker as well as by certain system-introduced noise, such as noise introduced by quantization and channel interference. If no attempt is made to mitigate the impact of the noise, the corruption of the speech signal will result in a degradation of the perceived quality and intelligibility of the speech signal when played back to a far-end listener. The corruption of the speech signal may also adversely impact the performance of speech processing algorithms used by the telephony system, such as speech coding and recognition algorithms.

Mobile audio terminals, such as Bluetooth™ headsets and cellular telephone handsets, are often used in outdoor environments that expose such terminals to a variety of noise sources including wind-induced noise on the microphones embedded in the audio terminals (referred to generally herein as "wind noise"). As described by Bradley et al. in "The Mechanisms Creating Wind Noise in Microphones," Audio Engineering Society (AES) $114^{th}$ Convention, Amsterdam, the Netherlands, Mar. 22-25, 2003, pp. 1-9, wind-induced noise on a microphone has been shown to consist of two components: (1) flow turbulence that includes vortices and fluctuations occurring naturally in the wind and (2) turbulence generated by the interaction of the wind and the microphone.

As also discussed by Bradley et al. in the aforementioned paper, the effect of wind noise is a more significant problem for handheld devices with embedded microphones, such as handheld cellular telephones, than for free-standing microphones. This is due, in part, to the fact that these handheld devices are larger than free-standing microphones such that the interaction with the wind is likely to be more important. This is also due, in part, to the fact that the proximity of a human hand, arm or head to such handheld devices may generate additional turbulence. This latter fact is also an issue for headsets used in telephony systems.

Generally speaking, wind noise is bursty in nature with gusts lasting from a few to a few hundred milliseconds. Because wind noise is impulsive and has a high amplitude that may exceed the nominal amplitude of a speech signal, the presence of such noise will degrade the perceptual quality and intelligibility of a speech signal in a manner that may annoy a far end listener and lead to listener fatigue. Furthermore, because wind noise is non-stationary in nature, it is typically not attenuated by algorithms conventionally used in telephony systems to reduce or suppress acoustic noise or system-introduced noise. Consequently, special methods for detecting and suppressing wind noise are required.

Currently, the most effective schemes for reducing wind noise are those that use two or more microphones. Because the propagation speed of wind is much slower than that of acoustic sound waves, wind noise can be detected by correlating signals received by the multiple microphones. In contrast, noise suppression algorithms that must rely on only a single microphone often confuse wind noise with speech. This is due, in part, to the fact that wind noise has a high energy relative to background noise, and thus presents a high signal-to-noise ratio (SNR). This is also due, in part, to the fact that wind noise is non-stationary and has a short duration in time, and thus resembles short speech segments.

Some wind noise reduction schemes do exist for audio devices having only a single microphone. For example, it is known that a fixed high-pass filter can be used to remove some portion of the low-frequency wind noise at all times. As another example, Published U.S. Patent Application No. 2007/0030989 to Kates, entitled "Hearing Aid with Suppression of Wind Noise" and filed on Aug. 1, 2006, describes a simple detector/attenuator that makes use of a single spectral characteristic of an audio signal—namely, the ratio of the low frequency energy of the audio signal to the total energy of the audio signal—to detect wind noise. However, these simple approaches are only effective for suppressing wind noise due to very low speed wind and are generally ineffective at suppressing wind noise due to moderate to high speed wind.

Wind noise reduction methods for single microphones also exist that are based on advanced digital signal processing (DSP) methods. For example, one such method is described by Schmidt et al. in "Wind Noise Reduction Using Non-Negative Sparse Coding," IEEE International Workshop on Machine Learning for Signal Processing, 2007. However, these methods are extremely complex computationally and at this stage not mature enough to be deemed effective.

What is needed, then, is a technique for effectively detecting and reducing non-stationary noise, such as wind noise, present in an audio signal received or recorded by a single microphone. When the audio signal is a speech signal received by a handset, headset, or other type of audio terminal in a telephony system, the desired technique should improve the perceived quality and intelligibility of the speech signal corrupted by the non-stationary noise. The desired technique should be effective at suppressing non-stationary noise due to low, moderate and high speed wind. The desired technique should also be of reasonable computational complexity, such that it can be efficiently and inexpensively integrated into a variety of audio device types.

BRIEF SUMMARY OF THE INVENTION

A method for suppressing non-stationary noise, such as wind noise, in an audio signal is described herein. In accordance with the method, a series of frames of the audio signal is analyzed to detect whether the audio signal comprises non-stationary noise. If it is detected that the audio signal comprises non-stationary noise, a number of steps are performed. In accordance with these steps, a determination is made as to whether a frame of the audio signal comprises non-stationary noise or speech and non-stationary noise. If it is determined that the frame comprises non-stationary noise, a first filter is applied to the frame. If it is determined that the frame comprises speech and non-stationary noise, a second filter is applied to the frame.

In one embodiment, applying the first filter to the frame comprises applying a fixed amount of attenuation to each of a plurality of frequency sub-bands associated with the frame and applying the second filter to the frame comprises applying a high-pass filter to the frame.

A further method for suppressing non-stationary noise, such as wind noise, in an audio signal is also described herein. In accordance with the method, it is determined whether each frame in a series of frames of the audio signal is a non-stationary noise frame. Non-stationary noise suppression is applied to each frame in the series of frames that is determined to be a non-stationary noise frame. Determining whether a frame is a non-stationary noise frame includes performing a combination of tests. Performing each test includes comparing one or more time and/or frequency characteristics of the audio signal to one or more time and/or frequency characteristics of the non-stationary noise.

Depending upon the implementation, performing the combination of tests comprises performing two or more of: determining a total number of strong frequency sub-bands associated with a frame; determining if one or more strong frequency sub-bands associated with a frame occur within a group of the lowest frequency sub-bands associated with the frame; performing a least squares analysis to fit a series of frequency sub-band energy levels associated with a frame to a linearly sloping downward line; determining a number of times that a time domain representation of a segment of the audio signal crosses a zero magnitude axis; calculating a difference between an energy level associated with a first strong frequency sub-band associated with a frame and a last strong frequency sub-band associated with the frame; determining if a spectral energy shape associated with a frame is monotonically decreasing; determining if a minimum number of strong frequency sub-bands associated with a frame occur in a group of low-frequency sub-bands and a minimum number of strong frequency sub-bands associated with the frame occur in a group of high-frequency sub-bands; calculating a ratio between a highest energy level associated with a frequency sub-band of a frame and a sum of energy levels associated with other frequency sub-bands of the frame; and correlating frequency transform values in a plurality of frequency sub-bands associated with the audio signal over time.

Yet another method for suppressing non-stationary noise, such as wind noise, in an audio signal is described herein. In accordance with the method, a determination is made as to whether a frame of the audio signal comprises non-stationary noise or speech and non-stationary noise. If it is determined that the frame comprises non-stationary noise, a first filter is applied to the frame. If it is determined that the frame comprises speech and non-stationary noise, a second filter is applied to the frame.

In one embodiment, applying the first filter to the frame comprises applying a fixed amount of attenuation to each of a plurality of frequency sub-bands associated with the frame. Applying the fixed amount of attenuation to each of the plurality of frequency sub-bands associated with the frame may include applying a flat attenuation to each of the plurality of frequency sub-bands associated with the frame.

In a further embodiment, applying the second filter to the frame comprises applying a high-pass filter to the frame. Applying the high-pass filter to the frame may include selecting the high-pass filter from a table of high-pass filters wherein the high-pass filter is selected based at least on an estimated energy of the non-stationary noise. Alternatively, applying the high-pass filter to the frame may include applying a parameterized high-pass filter to the frame, wherein one or more parameters of the parameterized high pass filter are calculated based at least on an estimated energy of the non-stationary noise.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
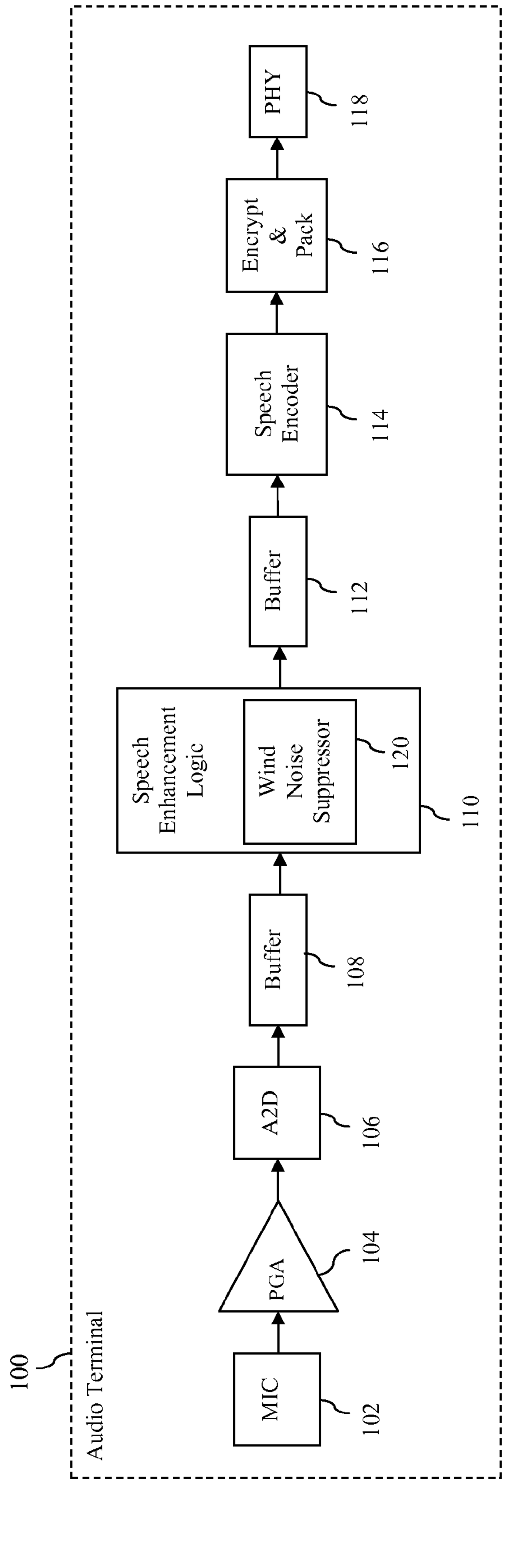
FIG. 1 is a block diagram of an example audio terminal in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that while portions of the following description of the present invention describe the processing of speech signals, the invention can be used to process any kind of general audio signal. Therefore, the term "speech" is used purely for convenience of description and is not limiting. Whenever the term "speech" is used, it can represent either speech or a general audio signal.

It should be further understood that although embodiments of the present invention described herein are designed to suppress wind noise, the concepts of the present invention may advantageously be used to suppress any type of non-stationary noise having known time and/or frequency characteristics, wherein such non-stationary noise may be either acoustic (e.g., typing, tapping, or the like) or non-acoustic. Thus, the present invention is not limited to the suppression of wind noise only.

B. Example Operating Environment

FIG. 1 is a block diagram of an example audio terminal 100 in which an embodiment of the present invention may be implemented. Audio terminal 100 is intended to represent a Bluetooth™ headset that is adapted to receive an input speech signal from a user via a single microphone and to generate information representative of that signal for wireless transmission to a Bluetooth™-enabled cellular telephone. The elements of example audio terminal 100 will now be described in more detail.

As shown in FIG. 1, audio terminal 100 includes a microphone 102. Microphone 102 is an acoustic-to-electric transducer that operates in a well-known manner to convert sound waves associated with a user's speech into an analog speech signal. A programmable gain amplifier (PGA) 104 is connected to microphone 102 and is configured to amplify the analog speech signal produced by microphone 102 to generate an amplified analog speech signal. An analog-to-digital (A2D) converter 106 is connected to PGA 104 and is adapted to convert the amplified analog speech signal produced by PGA 104 into a series of digital speech samples. The digital speech samples produced by A2D converter 106 are temporarily stored in a buffer 108 pending processing by speech enhancement logic 110.

Speech enhancement logic 110 is configured to process the digital speech samples stored in buffer 108 in a manner that tends to improve the perceptual quality and intelligibility of the speech signal represented by those samples. To perform this function, speech enhancement logic 110 includes a wind noise suppressor 120 in accordance with an embodiment of the present invention. As will be described in more detail herein, wind noise suppressor 120 operates to detect and suppress wind noise present within the speech signal represented by the digital speech samples stored in buffer 108. Such wind noise may have been introduced into the speech signal, for example, due to the interaction of wind with microphone 102. Speech enhancement logic 110 may also include other functional blocks including other types of noise suppressors and/or an echo canceller. Speech enhancement logic 110 processes the series of digital speech samples stored in buffer 108 in discrete groups of a fixed number of samples, termed frames. After speech enhancement logic 110 has processed a frame, the frame is temporarily stored in another buffer 112 pending processing by a speech encoder 114.

Speech encoder 114 is connected to buffer 112 and is configured to receive a series of frames therefrom and to compress each frame in accordance with an encoding technique. For example, the encoding technique may be a Continuously Variable Slope Delta Modulation (CVSD) technique that produces a single encoded bit corresponding to an upsampled representation of each digital speech sample in a frame. Encryption and packing logic 116 is connected to speech encoder 114 and is configured to encrypt and pack the encoded frames produced by CVSD encoder into packets. Each packet generated by encryption and packing logic 116 may include a fixed number of encoded speech samples. The packets produced by encryption and packing logic 116 are provided to a physical layer (PHY) interface 118 for subsequent transmission to a Bluetooth™-enabled cellular telephone over a wireless link. Such transmission may occur, for example, over a bidirectional Synchronous Connection Oriented (SCO) link.

Figure 2:
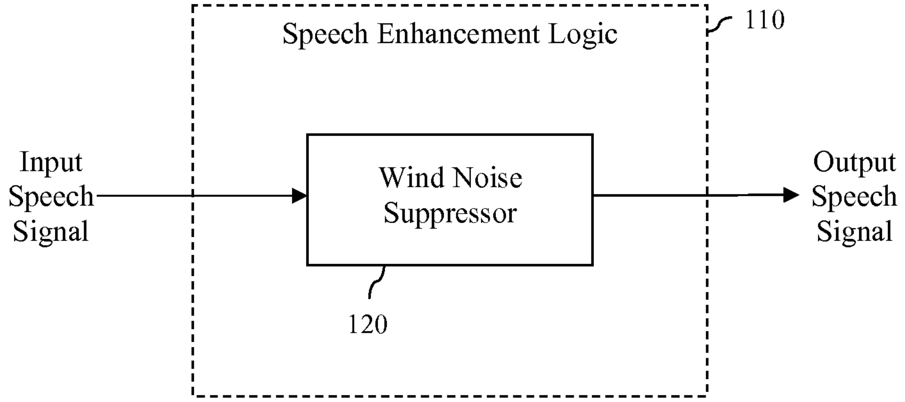
FIG. 2 is a block diagram depicting a wind noise suppressor in accordance with an embodiment of the present invention that is configured to operate in a stand-alone mode.

As shown in FIG. 2, in one implementation of the present invention, wind noise suppressor 120 is configured to operate in a stand-alone mode in which it detects wind noise present in the frames of an input speech signal and suppresses the detected wind noise, thereby generating frames of an output speech signal. In such an implementation, wind noise suppressor 120 is configured to compute all the parameters related to the input speech signal that are necessary for detecting wind noise as well as to apply any necessary gains to generate the output speech signal.

Figure 3:
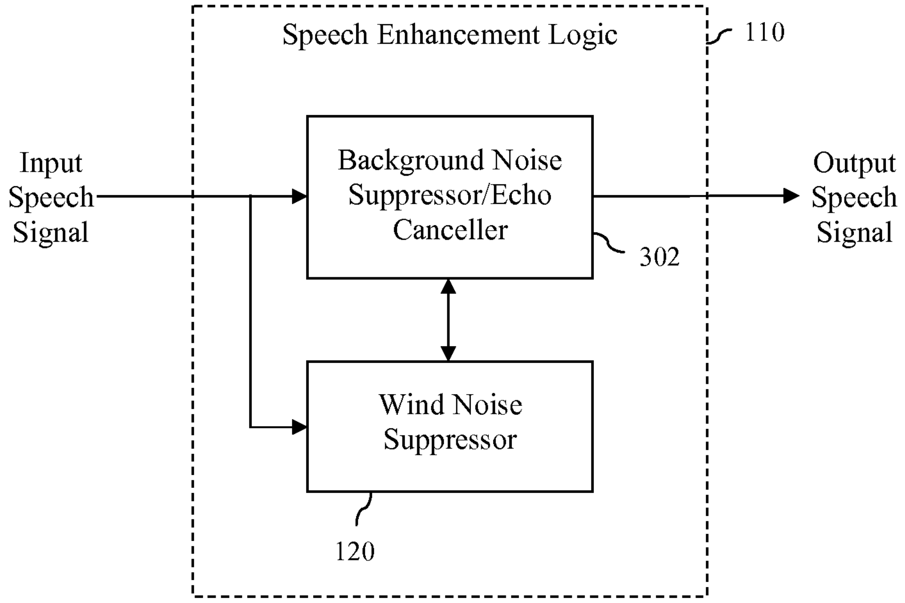
FIG. 3 is a block diagram depicting a wind noise suppressor in accordance with an embodiment of the present invention that is configured to operate in conjunction with a background noise suppressor/echo canceller.

As shown in FIG. 3, in an alternate embodiment of the present invention, wind noise suppressor 120 is configured to work in conjunction with a background noise suppressor/echo canceller 302. In such an implementation, background noise suppressor/echo canceller 302 and wind noise suppressor 120 process frames of an input speech signal in parallel to jointly produce frames of an output speech signal. To perform such processing, background noise suppressor/echo canceller 302 is configured to calculate certain parameters relating to the input speech signal for performing background noise suppression and/or echo cancellation. Wind noise suppressor 102 is configured to make use of these calculated parameters to detect wind noise in the input speech signal. Since both functional blocks are configured to make use of the same signal-related parameters, the processing speed of speech enhancement logic 110 can be increased while the amount of logic necessary to implement such logic can be decreased.

In the implementation shown in FIG. 3, any gains to be applied to the input speech signal are determined based both on gains determined by background noise suppressor/each canceller 302 and gains determined by wind noise suppressor 120. For example, a set of gains determined by wind noise suppressor 120 and a set of gains determined by background noise suppressor/echo canceller 302 may be combined and then applied to the input speech signal. Alternatively, a set of gains produced by each of the functional blocks may be analyzed and then the set of gains produced by one of the functional blocks may be selected for application to the input speech signal based on the analysis.

An example wind noise suppression algorithm that may be implemented by wind noise suppressor 120 will be described below. Although wind noise suppressor 120 has been described thus far in the context of a Bluetooth™ headset, persons skilled in the relevant art(s) based on the teachings provided herein will readily appreciate that wind noise suppressor 120 may be used in other types of audio terminals used in telephony systems, such as cellular telephones. Indeed, wind noise suppressor 120 can advantageously be implemented in any audio device that is capable of receiving an audio signal via a microphone. Such audio devices include but are not limited to audio recording devices and hearing aids. Wind noise suppressor 120 can also be used to suppress wind noise in audio signals received over a network (such as over a telephony network) or retrieved from a storage medium.

Figure 4:
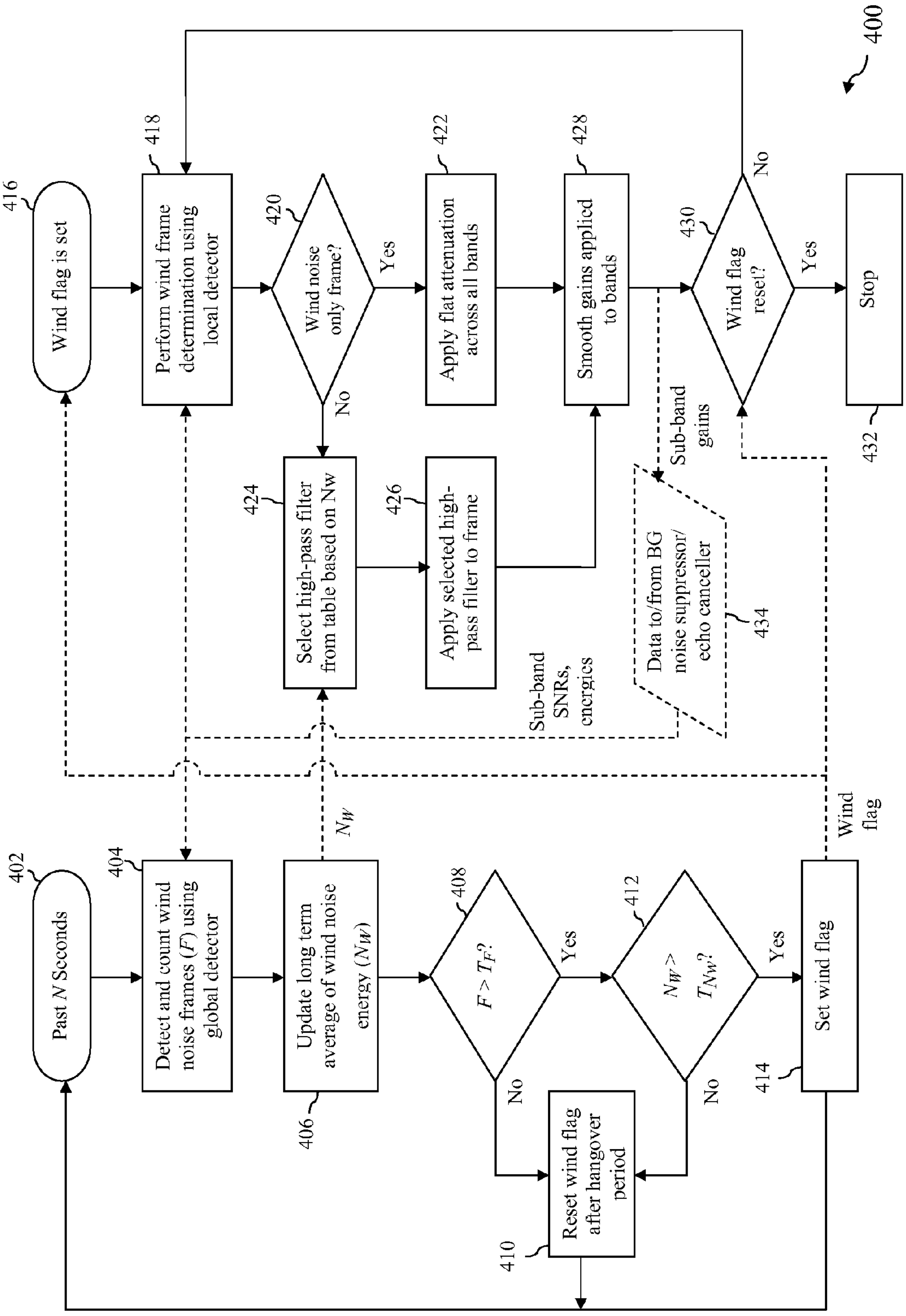
FIG. 4 depicts a flowchart of a method for performing wind noise suppression in accordance with an embodiment of the present invention.

C. Single-Microphone Wind Noise Suppression in Accordance with an Embodiment of the Present Invention FIG. 4 depicts a flowchart 400 of a method for performing wind noise suppression in accordance with an embodiment of the present invention. The method of flowchart 400 may be used to detect and suppress wind noise present in an audio signal received or recorded via a single microphone. Thus, the method may be used in a handset, headset, or other type of audio terminal in a telephony system to improve the perceived quality and intelligibility of a speech signal corrupted by wind noise. For example, the method of flowchart 400 may be implemented by wind noise suppressor 102 of audio terminal 100, as described above in reference to FIG. 1.

In accordance with the method of flowchart 400, the wind noise suppressor detects whether or not a channel over which an input audio signal is received is generally windy. This portion of the process of flowchart 400 is shown beginning at node 402, which indicates that the test for detecting whether or not the channel is windy is periodically performed over a sliding analysis window of N seconds of the input audio signal. In one embodiment, N is in the range of 8-15 seconds.

As shown at step 404, the wind noise suppressor uses a global wind noise detector to determine whether each frame in the series of frames encompassed by the analysis window is or is not a wind noise frame. As will be described in more detail below, the global wind noise detector makes this determination on a frame-by-frame basis based on the results of a variety of tests, wherein each test is based on one or more parameters associated with the input audio signal and exploits some known time and/or frequency characteristics of wind noise. In one embodiment, the parameters upon which the tests are based include signal-to-noise ratios (SNRs) and energies calculated for the frame being analyzed across a plurality of frequency sub-bands. These parameters may be calculated by the wind noise suppressor or, alternatively, may be provided by a background noise suppressor/echo canceller that operates in conjunction with the wind noise suppressor as shown by the arrow connecting node 434 to step 404 in flowchart 400.

As also shown in step 404, the wind noise suppressor counts the total number of frames in the series of frames encompassed by the analysis window that are determined to be wind noise frames, denoted F.

As shown at step 406, each time that the global wind noise detector determines that a frame of the input audio signal is a wind noise frame, the wind noise suppressor updates a long-term average of the wind noise energy based on an energy associated with the frame, wherein the energy associated with the frame is measured across all frequency sub-bands of the frame. This long-term average of the wind noise energy is denoted $N_W$ in FIG. 4. The long-term average of the wind noise energy provides an estimate of the power of wind in the channel over which the input audio signal is received. Persons skilled in the relevant art(s) will appreciate that, depending upon the implementation, metrics other than a long-term average of the wind noise energy may be used to estimate the power of the wind.

At decision step 408, the wind noise suppressor compares the total number of frames encompassed by the analysis window that are determined to be wind noise frames F to a predetermined threshold, denoted $T_F$. In one example embodiment, $T_F$ is set to 40 and the analysis window is 10 seconds long. If F does not exceed $T_F$, then the wind noise suppressor determines that a channel over which the input audio signal has been received is not windy and clears a wind flag accordingly as shown at step 410. In the embodiment shown in flowchart 400 of FIG. 4, the wind noise suppressor does not clear the wind flag immediately upon determining that F does not exceed $T_F$, but also waits for a predetermined time period to pass during which no wind noise frames are detected before clearing the wind flag. This time period is termed a "hangover period." The wind noise suppressor may use such a hangover period so as to avoid rapid switching between windy and non-windy states due to the highly fluctuating nature of wind. In one example embodiment, the hangover period is in the range of 10 to 20 seconds.

If F does exceed $T_F$, then the wind noise suppressor performs the test shown at decision step 412. In particular, at decision step 412, the wind noise suppressor determines if the current long-term average of the wind noise energy $N_W$ exceeds a predetermined energy threshold, denoted $T_{Nw}$. If $N_W$ does not exceed $T_{Nw}$, then the wind noise suppressor determines that the channel over which the input audio signal is received is not windy and clears the wind flag accordingly as shown at step 410. As noted above, the wind noise suppressor may also require that a predetermined hangover period expire before clearing the wind flag.

If $N_W$ does exceed $T_{Nw}$, then the wind noise suppressor determines that the channel over which the input audio signal is received is windy and sets the wind flag accordingly as shown at step 414. As will be described in more detail below, the setting of the wind flag by the wind noise suppressor is a necessary condition for performing wind noise suppression on any of the frames of the input audio signal. The comparing of F and $N_W$ to thresholds as described above ensures that the channel will not be declared windy if there is no wind during the analysis window or if the only wind that is detected during the analysis window is of short duration and/or is very low power. It is important in these scenarios not to declare a windy state as that can lead to the unnecessary and undesired attenuation of good audio frames.

After the wind flag is either cleared at step 410 or set at step 414, the analysis window of N seconds is slid forward by a predetermined amount of time and the process for determining whether the channel over which the input audio signal is received is windy is repeated starting again at node 402. The sliding of the analysis window forward in time means that one or more new frames of the input audio signal will be encompassed by the analysis window while an equal number of older frames will be removed from the analysis window. The wind noise suppressor will use the global wind noise detector to determine whether the new frame(s) are wind noise frames and will adjust the long-term average of wind noise energy based on any of the new frame(s) that are determined to be wind noise frames. The wind noise suppressor will also update the wind noise frame count F to account for the removal of any wind noise frames due to the sliding of the analysis window and to account for any newly-detected wind noise frames. The tests for setting or clearing the wind flag may then be repeated. This process for detecting a windy channel may be repeated any number of times depending on the length of the input audio signal.

If the wind noise suppressor determines that the channel over which the input audio signal is received is windy (which is denoted by the setting of the wind flag at step 414), then one of two general types of wind noise suppression will be applied to each frame of the input audio signal that is processed while the channel is deemed to be in a windy state. The type of wind noise suppression that will be applied to each frame will depend upon whether the frame is determined to represent wind noise only or speech combined with wind noise.

This portion of the process of flowchart 400 is shown beginning at node 416, which indicates that the wind flag has been set. The intermediate steps between node 416 and decision step 430, which will now be described, encompass the processing of a single frame of the input audio signal while the wind flag is set.

At step 418, the wind noise suppressor uses a local wind noise detector to determine whether the frame of the input audio signal represents wind noise or speech combined with wind noise. As will be described in more detail below, like the global wind noise detector, the local wind noise detector makes this determination on a frame-by-frame basis based on the results of a variety of tests, wherein each test is based on one or more parameters associated with the input audio signal and exploits some known time and/or frequency characteristics of wind noise. The parameters associated with the input audio signal may be calculated by the wind noise suppressor or, alternatively, provided by a background noise suppressor/echo canceller that operates in conjunction with the wind noise suppressor as shown by the arrow connecting node 434 to step 418 in flowchart 400.

In one embodiment, the tests relied upon by the local wind noise detector are selected and/or configured such that the local wind noise detector is more likely to deem a frame a wind noise frame than the global wind noise detector. By using a global wind noise detector that is more conservative in detecting wind noise than the local wind noise detector, an embodiment of the present invention reduces the chances that the channel over which the input audio signal is received will be declared windy in situations where there is actually little or no wind. This helps ensure that wind noise suppression will not be unnecessarily applied to an otherwise uncorrupted audio signal. Once the more stringent global wind noise detector has been used to determine that the channel is windy, a more lax local wind noise detector can be used to classify frames, since the windy state has already been determined with a high degree of confidence. In one embodiment, the local wind noise detector determines whether a frame is a wind noise frame by using the results of only a subset of the tests relied upon by the global wind noise detector.

At decision step 420, the wind noise suppressor uses the determination made by the local wind noise detector in step 418 to select what type of wind noise suppression will be applied to the frame of the input audio signal. In particular, if the local wind noise detector determines that the frame represents wind noise only, then the wind noise suppressor will apply a flat attenuation to all the frequency sub-bands of the frame of the input audio signal to significantly reduce the wind noise as shown at step 422. For example, a flat attenuation in the range of 10-13 dB may be applied across all frequency sub-bands of the frame of the input audio signal. In one implementation, the amount of attenuation is selected so that it does not exceed a maximum attenuation amount that may be applied by a background noise suppressor/echo canceller operating in conjunction with the wind noise suppressor. In an alternative embodiment, instead of a flat attenuation across all sub-bands, a shaped attenuation pattern is applied across the frequency sub-bands of the frame. For example, an extra amount of attenuation may be applied to the lowest M frequency sub-bands of the frame as compared to the remaining frequency sub-bands of the frame.

If the local wind noise detector determines that the frame represents speech and wind noise, then the wind noise suppressor will apply a high-pass filter to the frame of the input audio signal as shown at steps 424 and 426. In particular, at step 424, the wind noise suppressor selects a high-pass filter from a table of predefined high-pass filters, wherein the high-pass filter is selected based at least on the current long-term average of the wind noise energy $N_W$ as determined by the wind noise suppressor in step 406, and at step 426, the wind noise suppressor applies the selected high-pass filter to the frame of the input audio signal.

In one example embodiment, each of the high-pass filters comprises a parameterized high-pass filter defined by the equation N−a(w−b)^c, wherein w is frequency in unit of bands, N controls the maximum attenuation point of the filter, and a, b and c control the slope of the filter.

Although each high-pass filter in the table will operate to attenuate lower frequency components of the frame to which it is applied, the high-pass filters in the table vary in both the amount of attenuation that will be applied and the number of low frequency sub-bands to which such attenuation will be applied. Generally speaking, the greater the long-term average of the wind noise energy $N_W$, the greater the attenuation applied by the selected high-pass filter and the greater the number of lower frequency sub-bands to which such attenuation is applied.

This approach takes into account the shape of the spectral envelope generally associated with wind noise and the manner in which that shape varies depending upon wind speed. It has been observed that the spectral envelope for wind noise is generally flat up to approximately 100-300 hertz (Hz) and then decays with frequency up to 1, 2 or 3 kilohertz (kHz) depending on the speed. As wind speed increases, both the magnitude of the lower frequency components and the number of sub-bands over which the spectral envelope will decay increase.

Figure 5:
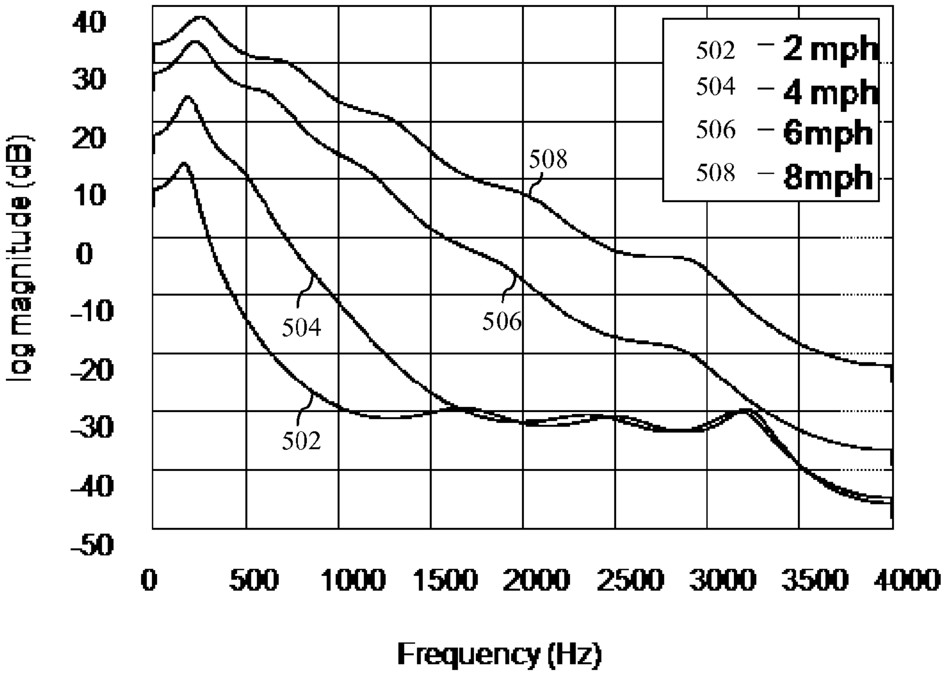
FIG. 5 is a graph showing example spectral envelopes of wind noise generated by wind directed at a telephony headset at a zero degree angle and travelling at speeds of 2 miles per hour (mph), 4 mph, 6 mph and 8 mph.

For example, FIG. 5 shows example spectral envelopes of wind noise generated by wind directed at a telephony headset at a zero degree angle and travelling at speeds of 2 miles per hour (mph)(denoted with reference numeral 502), 4 mph (denoted with reference numeral 504), 6 mph (denoted with reference numeral 506) and 8 mph (denoted with reference numeral 508). As can be seen by this figure, the greater the wind speed, the greater the magnitude of the lower frequency components of the wind noise and the greater the frequency range over which the spectral envelope decays.

Figure 6:
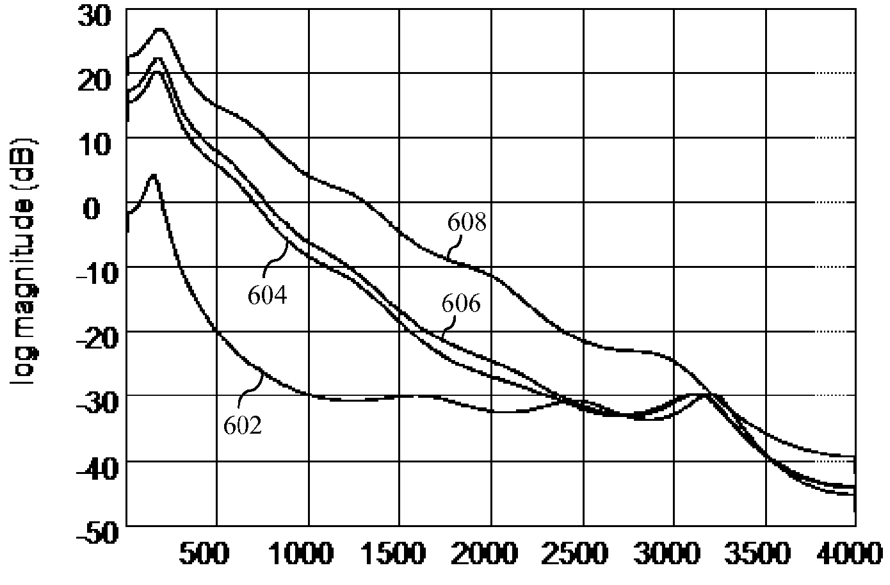
FIG. 6 is a graph showing example spectral envelopes of wind noise generated by wind directed at a telephony headset at a 45 degree angle and travelling at speeds of 2 mph, 4 mph, 6 mph and 8 mph.

FIG. 6 shows example spectral envelopes of wind noise generated by wind directed at a telephony headset at a 45 degree angle and travelling at speeds of 2 mph (denoted with reference numeral 602), 4 mph (denoted with reference numeral 604), 6 mph (denoted with reference numeral 606) and 8 mph (denoted with reference numeral 608) that display a similar trend.

Since the long-term average of the wind noise energy $N_W$ will increase as wind speed increases, an embodiment of the present invention uses this parameter to select a high-pass filter from a table of predefined high-pass filters so that an appropriate amount of attenuation is applied to the frame over an appropriate frequency range. As noted above, the greater the value of $N_W$, the greater the attenuation applied by the selected high-pass filter and the greater the number of lower frequency sub-bands to which such attenuation is applied. In this way, the wind noise suppressor can advantageously adapt the manner in which speech frames that include wind noise are attenuated to take into account changes in wind speeds.

In an alternative embodiment, instead of selecting a high-pass filter from a table of predefined high-pass filters, the wind noise suppressor may apply a single parameterized high-passed filter to the frame of the input audio signal, wherein one or more of the parameter of the filter are calculated as a function of at least the long-term average of the wind noise energy $N_W$, such that the filter response can be adapted to take into account changes in wind speeds.

After step 422 or step 426 has ended, the wind noise suppressor smooths any gains to be applied to the frequency sub-bands of the frame of the input audio signal as a result of either the application of the flat attenuation in step 422 or the application of the selected high-pass filter in step 426. In view of the fact that the wind noise suppressor may respectively apply two different types of wind noise suppression to two consecutive frames, such smoothing is performed to ensure that gains do not change abruptly from one frame to the next. Such abrupt changes in gains may lead to undesired perceptible artifacts in the output audio signal and are to be avoided. Any suitable type of smoothing function may be used to perform this step, including but not limited to smoothing functions based on auto-regressive averaging or running means.

After the wind suppressor has applied smoothing to the gains at step 428, the smoothed gains may be applied to each frequency sub-band of the frame of the input audio signal to generate a frame of an output audio signal. In the embodiment of the invention shown in FIG. 4, the smoothed gains for each frequency sub-band are first provided to a background noise suppressor/echo canceller operating in conjunction with the wind noise suppressor as shown by the arrow extending from step 428 to node 434. The background noise suppressor/echo canceller may combine the sub-band gains received from the wind noise suppressor with sub-band gains generated by the background noise suppressor/echo canceller prior to applying the sub-band gains to the frame of the input audio signal. Alternatively, the background noise suppressor/echo canceller may analyze the sub-band gains provided by the wind noise suppressor and the sub-band gains generated by the background noise suppressor/echo canceller and then select one or the other sets of sub-band gains for application to the frame of the input audio signal based on the analysis.

After the sub-band gains have been applied or provided to the background noise suppressor/echo canceller depending upon the implementation, the wind noise suppressor determines at decision step 430 whether or not the wind flag has been cleared, thereby indicating that the channel over which the input audio signal is received is no longer deemed windy. If the wind flag has not been cleared, then wind noise suppression will be applied to the next frame of the input audio signal as denoted by the arrow connecting decision step 430 back to step 418. If the wind flag has been cleared, then wind noise suppression ceases as shown at step 432 until such time as the wind flag is set again.

Figure 7:
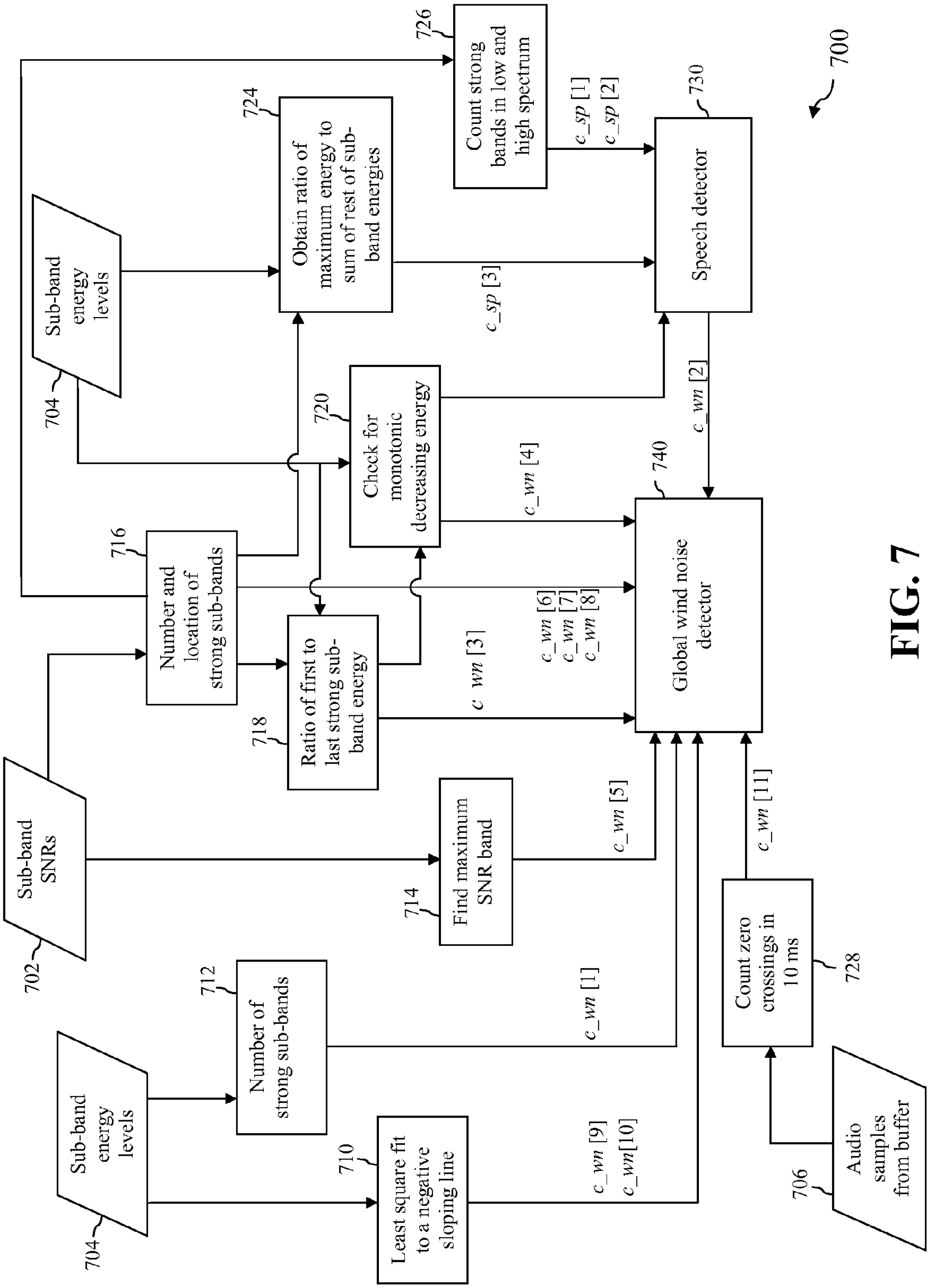
FIG. 7 is a block diagram of a system for performing global wind noise detection in accordance with an embodiment of the present invention.

D. Global Wind Noise Detection in Accordance with an Embodiment of the Present Invention FIG. 7 is a block diagram of an example system 700 for performing global wind noise detection in accordance with an embodiment of the present invention. System 700 may be used in a wind noise suppressor to perform step 404 of flowchart 400, as described above in reference to FIG. 4. System 700 is described herein by way of example only. Persons skilled in the relevant art(s) will appreciate that other systems may be used to perform global wind noise detection.

As shown in FIG. 7, system 700 includes a number of logic blocks, each of which is configured to perform a unique test to determine whether a condition exists that suggests that a frame of an input audio signal includes wind noise. The tests are based on one or more parameters associated with the input audio signal and are designed to exploit various time and/or frequency characteristics of wind noise. The output of each logic block that performs such a test is a single binary value indicating whether or not a condition exists that suggests that the frame includes wind noise, wherein a "0" indicates that wind noise is not suggested and a "1" indicates that wind noise is suggested. These binary values are labeled c_wn [1], c_wn [2 ], . . . , c_wn [13] in FIG. 7. Since no one test is fully robust for detecting wind noise in all conditions, multiple different tests are performed to ensure that wind noise can be detected with a high degree of confidence and to avoid the accidental application of wind noise suppression to speech frames that include little or no wind noise.

As further shown in FIG. 7, system 700 includes a global wind noise detector 740 that receives each of the binary values c_wn [1], $c_{13}$wn [2], . . . , c_wn [13] and then, based on those values, determines whether or not the frame of the input audio signal comprises a wind noise frame.

Each of the tests applied by system 700 will now be described. Following the description of the tests, a description of an example implementation of global wind noise detector 740 will be provided.

1. Number and Location of Strong Sub-Bands Based on SNRs

Logic block 716 receives a set of SNRs 702 calculated for a frame, wherein each SNR is associated with a different frequency sub-band of the frame. Logic block 716 compares the SNR for each frequency sub-band to a threshold, and if the SNR exceeds the threshold, logic block 716 identifies the corresponding frequency sub-band as a strong frequency sub-band. In one example embodiment, the threshold is in the range of 8-10 dB. Logic block 716 thus determines the location in the spectrum of each strong frequency sub-band for the frame. Logic block 716 also counts the total number of strong frequency sub-bands for the frame.

For a wind frame, the total number of strong frequency sub-bands should be small. Accordingly, in one embodiment, logic block 716 sets binary value c_wn [6] to "1" only if the total number of strong frequency sub-bands is less than a predefined threshold. In one example embodiment, logic block 716 sets binary value c_wn [6] to "1" if the total number of strong frequency is less than ⅓ to ½ of all the frequency sub-bands, wherein the frequency sub-bands correspond to for example Bark scale bands.

Furthermore, for a wind frame, the strong frequency sub-bands should all be located in the lower portion of the frequency spectrum. Accordingly, in one embodiment, logic block 716 determines how many strong frequency sub-bands occur above the n lowest frequency sub-bands, wherein n is set to the total number of strong frequency sub-bands for the frame. If the number of strong frequency sub-bands occurring above the n lowest frequency sub-bands is less than 25% of the total number of frequency sub-bands, then logic block 716 sets c_wn [7] to "1."

Finally, a wind noise frame can be expected to have at least one strong frequency sub-band. Therefore, in one embodiment, logic block 716 sets binary value c_wn [8] to "1" only if the number of strong frequency sub-bands is greater than zero.

2. Number of Strong Sub-Bands Based on Energy Levels

Logic block 712 receives a set of energy levels 704 calculated for a frame, wherein each energy level is associated with a different frequency sub-band of the frame. Logic block 712 calculates a ratio of the energy level for each frequency sub-band to an estimate of echo and background noise for the frame. Logic block 712 then compares the calculated ratio for each frequency sub-frame to a threshold, and if the ratio exceeds the threshold, logic block 712 identifies the corresponding frequency sub-band as a strong frequency sub-band. In one example embodiment, the threshold against which the ratio is compared is approximately 10 dB. Logic block 712 then counts the total number of strong frequency sub-bands for the frame. For a wind frame, the total number of strong frequency sub-bands should be small. Accordingly, in one embodiment, logic block 712 sets binary value c_wn [1] to "1" only if the total number of strong frequency sub-bands is less than a predefined threshold. In one example embodiment, logic block 712 sets binary value c_wn [1] to "1" only if the total number of strong frequency sub-bands is less than approximately 60%-70% of all the frequency sub-bands, wherein the frequency sub-bands correspond to for example Bark scale bands.

3. Least Square Fit to a Negative Sloping Line

Because wind noise is expected to have a spectral envelope that decays in a roughly linear fashion (for example, see FIGS. 5 and 6), logic block 710 fits the energy levels 704 for the frequency sub-bands of the frame to a line of the form $$y=a\cdot x+b$$

where a is the slope. As will be appreciated by persons skilled in the relevant art(s), using a least squares analysis, an estimate of the slope a, which may be denoted $\hat{a}$, may be obtained by solving the normal equations $$\hat{a}=[X^TX]^{-1}X^Ty$$

where the matrix X is an apriori known constant, y is a vector corresponding to the energy values for the frequency sub-bands starting with the lowest frequency sub-band and progressing to the highest, and x represents the frequency values or indices. Based on the least squares analysis, logic block 710 obtains both the estimate of the slope $\hat{a}$ and the least squares fit error.

For wind noise, it is to be expected that the least squares fit error will be small. Accordingly, in one embodiment, logic block 710 sets binary value c_wn [9] to "1" only if the least squares fit error is less than a predefined threshold. In one example embodiment, the predefined threshold is somewhere in the range of 5-10%. Also, for wind noise, it is to be expected that the estimated slope obtained through the least squares analysis will be negative. Accordingly, in one embodiment, logic block 710 sets binary value c_wn [10] to "1" only if the estimated slope is negative.

4. Number of Zero Crossings in the Time Waveform

Logic block 728 receives a series of audio samples 706 from a buffer that represents a previous 10 milliseconds (ms) segment of the input audio signal. Based on audio samples 706, logic block 728 determines a number of times that a time domain representation of the audio signal segment crosses a zero magnitude axis (i.e., transitions from a positive to negative magnitude or from a negative to positive magnitude). Since wind noise is largely low-frequency noise, it is anticipated that wind noise would have a low number of zero crossings. Accordingly, in one embodiment, logic block 728 sets binary value c_wn [11] to "1" only if the number of zero crossings is less than a predefined threshold. For example, logic block 728 may set binary value c_wn [11] to "1" only if the number of zero crossings is less then 4-5 crossings in a 10 msec interval. Because the zero crossings value may fluctuate dramatically, in one implementation logic block 728 applies some smoothing to the value before applying the test. To improve performance, DC removal may be applied to the signal segment prior to calculating the zero crossing rate. Persons skilled in the relevant art(s) will appreciated that segment lengths other than 10 ms may be used to perform this test.

5. Find Maximum SNR Sub-band

Logic block 714 receives frequency sub-band SNRs 702 and identifies the frequency sub-band having the strongest SNR. For wind noise, it is to be expected that the frequency sub-band having the strongest SNR will be in the lower frequency sub-bands. Accordingly, in one embodiment, logic block 714 sets binary value c_wn [5] to "1" if the frequency sub-band having the strongest SNR is located in a group of the lowest frequency sub-bands. This test may be implemented, for example, by assigning an index to each of the frequency sub-bands, wherein the lowest index value is assigned to the lowest frequency sub-band and the index value increases with the frequency of each successive frequency sub-band. In such an implementation, the test may be performed by determining if the index of the frequency sub-band having the strongest SNR is less than a predefined index. In one example embodiment that utilizes Bark scale frequency bands, the predefined index value is 4 or 5.

6. Ratio of First to Last Strong Sub-Band Energy

Logic block 718 receives an indication from logic block 716 of the location of the first strong frequency sub-band in the spectrum based on SNR and the last strong frequency sub-band in the spectrum based on SNR. Assuming that the frequency sub-bands are indexed from lowest frequency to highest frequency, this information may be provided from logic block 716 to logic block 718 by passing the lowest index value associated with a strong frequency sub-band and the highest index value associated with a strong frequency sub-band. Logic block 718 then obtain the energy levels 704 for the first and last strong frequency sub-bands respectively and calculates a difference between them. For wind noise, it is to be expected that the energy level between the first strong frequency sub-band and the last strong frequency sub-band will drop at a rate of approximately 1 dB per sub-band or faster (depending on wind speed and the sub-band frequency width). Accordingly, in one embodiment, logic block 718 sets binary value c_wn [3] to "1" only if the difference in energy level between the first strong frequency sub-band and the last strong frequency sub-band is at least 1 dB per sub-band.

7. Spectrum with Monotonically Decreasing Slope

Logic block 720 receives an indication from logic block 716 of the location of the first strong frequency sub-band in the spectrum based on SNR and the last strong frequency sub-band in the spectrum based on SNR. Assuming that the frequency sub-bands are indexed from lowest frequency to highest frequency, this information may be provided from logic block 716 to logic block 720 by passing the lowest index value associated with a strong frequency sub-band and the highest index value associated with a strong frequency sub-band. Logic block 720 then obtains the energy levels 704 for the first strong frequency sub-band, the last strong frequency sub-band, and every frequency sub-band in between.

Logic block 720 then calculates an absolute energy level difference between each pair of consecutive frequency sub-bands in a range beginning with the first strong frequency sub-band and ending with the last strong frequency sub-band and sums the absolute energy level differences. Logic block 720 also calculates the energy level difference between the first strong frequency sub-band and the last strong frequency sub-band.

It is to be expected that the spectral energy shape of wind noise will be monotonically decreasing. If the spectral energy shape is monotonically decreasing, then the energy level difference between the first strong frequency sub-band and the last strong frequency sub-band should be greater than zero. Furthermore, if the spectral energy shape is monotonically decreasing, then the sum of the absolute energy level differences should be close to the energy level difference between the first strong frequency sub-band and the last strong frequency sub-band. Accordingly, in one embodiment, logic block 720 sets binary value c_wn [4] to "1" only if (1) the energy level difference between the first strong frequency sub-band and the last strong frequency sub-band is greater than zero and (2) the sum of the absolute energy level differences is greater than one-half the energy level difference between the first strong frequency sub-band and the last strong frequency sub-band and less than two times the energy level difference between the first strong frequency sub-band and the last strong frequency sub-band.

8. Speech Detection

As shown in FIG. 7, system 700 includes a speech detector 730. Speech detector 730 receives the results of tests implemented by logic block 724 and logic block 726 and, based on those results and information from logic block 720, determines whether or not a speech frame has been detected over some period of time. Speech detector 730 is used as part of system 700 to avoid attenuating frames that are highly likely to comprise speech. The test results provided by logic blocks 724 and 726 are denoted by binary values c_sp [1], c_sp [2] and c_sp [3], which are set to "1" if a frame exhibits characteristics indicative of speech. The operation of each of these logic blocks will now be described.

Logic block 726 receives information concerning the number and location of strong frequency sub-bands based on SNRs from logic block 716. Based on this information, logic block 726 counts the number of strong frequency sub-bands in a group of lower frequency sub-bands and counts the number of strong frequency sub-bands in a group of higher frequency sub-bands. For speech, it is to be expected that there will be some minimum number of strong frequency sub-bands in the lower spectrum as well as some minimum number of strong frequency sub-bands in the higher spectrum. Accordingly, in one embodiment, logic block 726 sets binary value c_sp [1] to "1" only if the number of strong frequency sub-bands in a group of lower frequency sub-bands exceeds a first predefined threshold (e.g., 6 in an embodiment that utilizes Bark scale sub-bands) and set binary value c_sp [2] to "1" only if the number of strong frequency sub-bands in a group of higher frequency sub-bands exceeds a second predefined threshold (e.g., 2 in an embodiment that utilizes Bark scale sub-bands).

Logic block 724 receives sub-band frequency energy levels 704 and identifies the frequency sub-band having the highest energy level. Logic block 724 then obtains a ratio of the highest energy level to a sum of the energy levels associated with all frequency sub-bands that are not the frequency sub-band having the highest energy level. For wind noise, it is expected that this ratio will be high since the energy of wind noise will be concentrated in only a few frequency sub-bands, while for speech it is expected that this ratio will be low since the energy of a speech signal is more distributed throughout the spectrum. Accordingly, in one embodiment, logic block 722 sets binary value c_sp [3] to "1" if the ratio is less than a predefined threshold.

Figure 8:
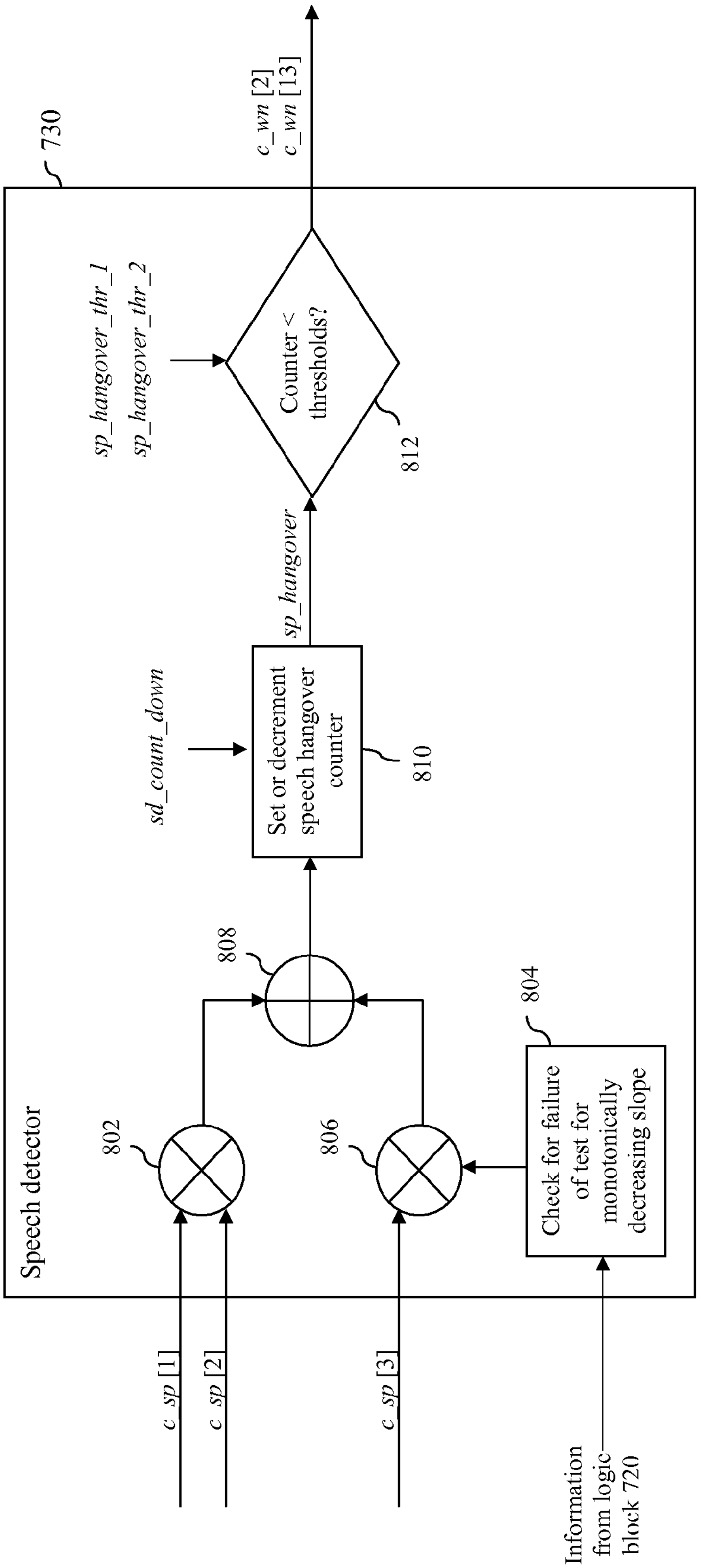
FIG. 8 is a block diagram of a speech detector that may be used for performing global and local wind noise detection in accordance with an embodiment of the present invention.

FIG. 8 is a block diagram of speech detector 730 in accordance with one embodiment of the present invention. As shown in FIG. 8, speech detector 730 receives as inputs the binary values c_sp [1] and c_sp [2] from logic block 726, the binary value c_sp [3] from logic block 724 and information from logic block 720, and outputs binary values c_wn [2] and c_wn [13]. Binary value c_wn [2] is provided to global wind noise detector 740 while binary value c_wn [13] is provided to a local wind noise detector to be described elsewhere herein. The operation of the elements within speech detector 730 as shown in FIG. 8 will now be described.

A logic element 802 performs a logical "AND" operation on the binary values c_sp [1] and c_sp [2] such that logic element 802 will only produce a "1" if both c_sp [1] and c_sp [2] are equal to "1". As described above, binary values c_sp [1] and c_sp [2] will both be equal to "1" when strong frequency sub-bands are detected both in the lower and upper spectrum, which is indicative of a speech frame.

A logic block 804 receives information from logic block 720 and uses that information to determine if the spectral energy shape associated with a frame does not appear to be monotonically decreasing. This test may comprise determining if c_wn [4], which is produced by logic block 720, is equal to "0" or some other test. If the spectral energy shape associated with the frame does not appear to be monotonically decreasing then this is indicative of a speech frame and logic block 804 outputs a "1".

A logic element 806 performs a logical "AND" operation on the binary value c_sp [3] and the output of logic block 804 such that logic element 806 will only produce a "1" if both c_sp [3] and the output of logic block 804 are equal to "1". When both c_sp [3] and the output of logic block 804 are equal to "1", the spectral energy shape is indicative of a speech frame.

A logic element 808 performs a logical "OR" operation on the output of logic element 802 and the output of logic element 806 such that logic element 808 will produce a "1" if the output of logic element 802 or the output of logic element 806 is equal to "1".

A logic block 810 receives the output of logic element 808 and if the output is equal to "1", which is indicative of a speech frame, logic block 810 sets a speech hangover counter, denoted sp_hangover, to a predefined value, which is denoted sd_count_down. In one example embodiment, sd_count_down equals 20. However, if the output is equal to "0", which is indicative of a non-speech frame, then logic block 810 decrements sp_hangover by one.

Logic block 812 compares the value of sp_hangover to a first predefined threshold, denoted sp_hangover_thr_1, and a second predefined threshold, denoted sp_hangover_thr_2, wherein the first threshold is larger than the second threshold. In one example embodiment, sp_hangover_thr_1 is equal to 10 and sp_hangover_thr_2 is equal to 5. If the value of sp_hangover is greater than both the first threshold sp_hangover_thr_1 and the second threshold sp_hangover_thr_2, then logic block 812 sets both binary values c_wn [2] and c_wn [13] equal to "0", which is indicative of a speech condition. However, if the value of sp_hangover has been decremented such that it is below the first threshold sp_hangover_thr_1 but not below the second threshold sp_hangover_thr_2, then logic block 812 sets binary value c_wn [2] to "0", which is indicative of a speech condition and sets binary value c_wn [13] to "1", which is indicative of a non-speech condition that has existed for a first period of time. Furthermore, if the value of sp_hangover has been decremented such that it is below both the first threshold sp_hangover thr_1 and the second threshold sp_hangover_thr_2, then logic block 812 sets binary value c_wn [13] to "1", which is indicative of a non-speech condition that has existed for the first period of time and sets binary value c_wn [2] to "1", which is indicative of a non-speech condition that has existed for a second period of time that is longer than the first period of time. The duration of the first and second periods of time can be configured by changing the corresponding first and second thresholds sp_hangover_thr_1 and sp_hangover_thr_2.

The use of a speech hangover counter in the above manner by speech detector 730 ensures that a non-speech condition will not be detected unless it has existed for some margin of time. This accounts for the intermittent nature of speech signals. A longer effective hangover period is used for generating the output to the global wind noise detector than is used for generating the output to the local wind noise detector, such that the global wind noise detector will be more conservative in determining that a non-speech condition has been detected.

9. Autocorrelation in Time of Frequency Bins

In an alternative embodiment of the present invention, additional logic may be added to the system of FIG. 7 that correlates frequency transform values in a number of finely-spaced frequency sub-bands associated with an input audio signal over time. In particular, for each frequency sub-band, an autocorrelation may be performed based on the frequency transform values at various points in time (which may be termed "bins") in that band, where the points in time are separated by k frames. Due to the strong harmonic nature of speech, it is expected that speech will produce a strong autocorrelation using this method. Wind noise on the other hand is not harmonic so that it will likely produce a weak autocorrelation. The results of this test can be provided to global wind noise detector 740 and used to determine if a frame is a wind noise frame.

For example, consider the speech signal in a given frequency sub-band. For the case of voiced speech, we assume the signal is deterministic (or quasi-deterministic) and stationary (or quasi-stationary) for the duration of the analysis window. In addition, since voiced speech has a harmonic nature (i.e., sinusoidal in a given frequency sub-band), then looking at two points in time that are spaced by k frames, we have:

$$X(n-k)=A_{n-k}e^{j\theta_{n-k}} \text{ and } X(n)=A_n e^{j(\theta_{n-k}+\Delta\theta)}$$

where A represents the amplitude of the speech signal, θ represents the phase of the speech signal, and Δθ represents the phase difference. The cross-product would yield:

$$E[X^*(n-k)X(k)]=A_{n-k}A_n e^{j\Delta\theta},$$

where $$\Delta\theta=2\pi\times\text{band freq}\times k\times\text{frame time}$$

Due to the near-stationary nature of voiced speech, the magnitude is constant:

$A_{n-k}\approx A_n$ for any k within the analysis frame

Thus, with proper normalization, one expects a constant (or slowly moving) cross-correlation value during (voiced) speech and a random, near-zero value during wind noise, since wind does not have the steady energy when viewed from within a frequency sub-band and across time.

10. Example Global Wind Noise Detector

Figure 9:
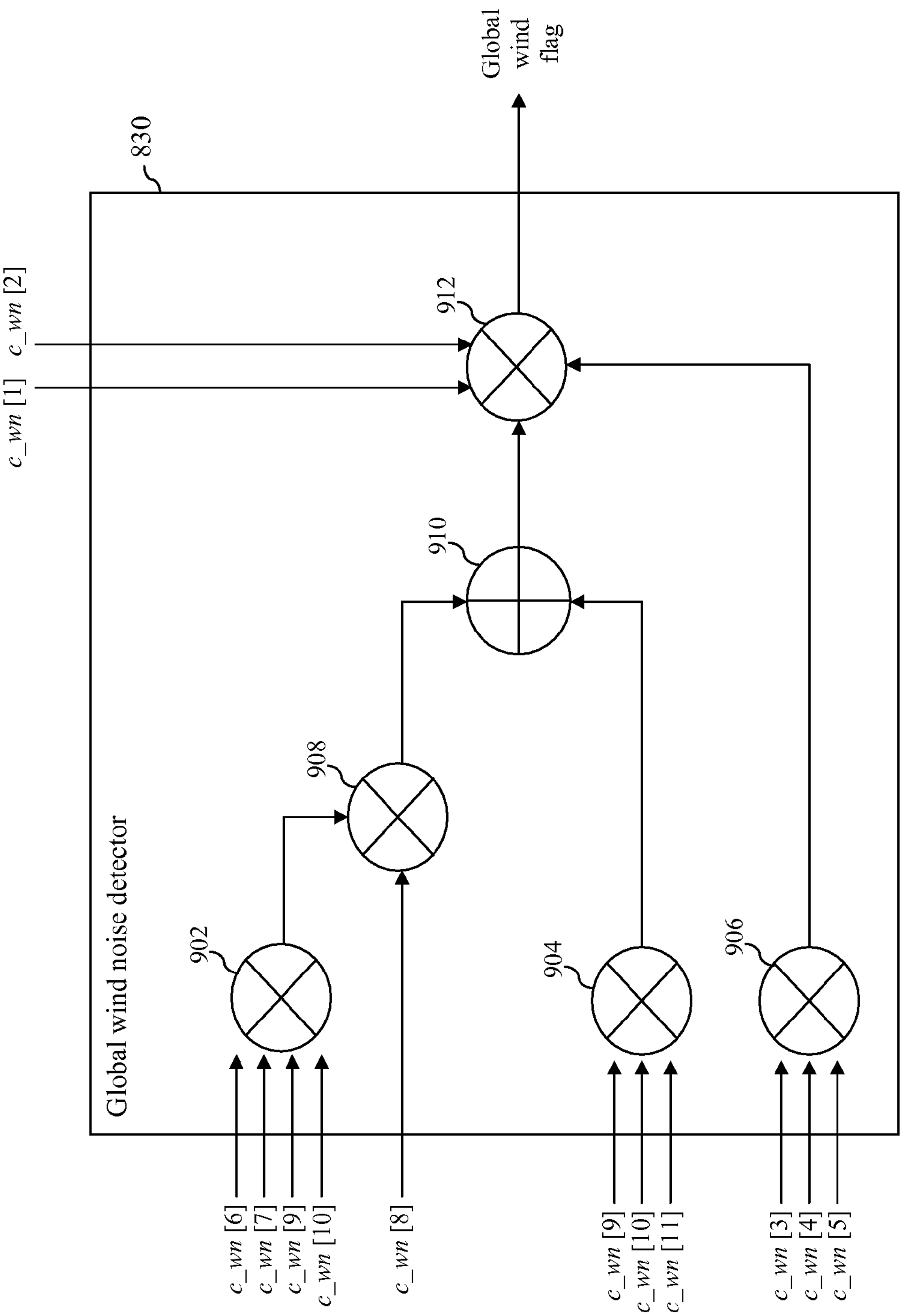
FIG. 9 is a block diagram of a global wind noise detector in accordance with an embodiment of the present invention.

FIG. 9 is a block diagram of global wind noise detector 740 in accordance with one embodiment of the present invention. As shown in FIG. 9, global wind noise detector 740 receives as inputs the binary values c_wn [1], c_wn [2], c_wn [11] as produced by logic blocks described above in reference to system 700 of FIG. 7 and outputs a flag indicating whether or not a frame has been deemed a wind noise frame. The operation of the elements within global wind noise detector 740 as shown in FIG. 9 will now be described.

A logic element 902 performs a logical "AND" operation on the binary values c_wn [6], c_wn [7], c_wn [9] and c_wn [10] such that logic element 902 will only produce a "1" if each of c_wn [6], c_wn [7], c_wn [9] and c_wn [10] is equal to "1".

A logic element 908 performs a logical "AND" operation on the output of logic element 902 and the binary value c_wn [8] such that logic element 908 will only produce a "1" if both the output of logic element 902 and the binary value c_wn [8] are equal to "1".

A logic element 904 performs a logical "AND" operation on the binary values c_wn [9], c_wn [10] and c_wn [11] such that logic element 904 will only produce a "1" if each of c_wn [9], c_wn [10] and c_wn [11] is equal to "1".

A logic element 910 performs a logical "OR" operation on the output of logic element 908 and the output of logic element 904 such that logic element 910 will produce a "1" if the output of logic element 908 or the output of logic element 904 is equal to "1".

A logic element 906 performs a logical "AND" operation on the binary values c_wn [3], c_wn [4] and c_wn [5] such that logic element 906 will only produce a "1" if each of c_wn [3], c_wn [4] and c_wn [5] is equal to "1".

A logic element 912 performs a logical "AND" operation on the binary value c_wn [1], the binary value c_wn [2], the output of logic element 910 and the output of logic element 906 such that logic element 912 will only produce a "1" if each of c_wn [1], c_wn [2], the output of logic element 910 and the output of logic element 906 are equal to "1". If the output of logic element 912 is a "1" then this means that a wind noise frame has been detected by global wind noise detector 740. If the output of logic element 912 is a "0" then this means that a wind noise frame has not been detected. The output of logic element 912 is denoted "global wind flag" in FIG. 9.

Figure 10:
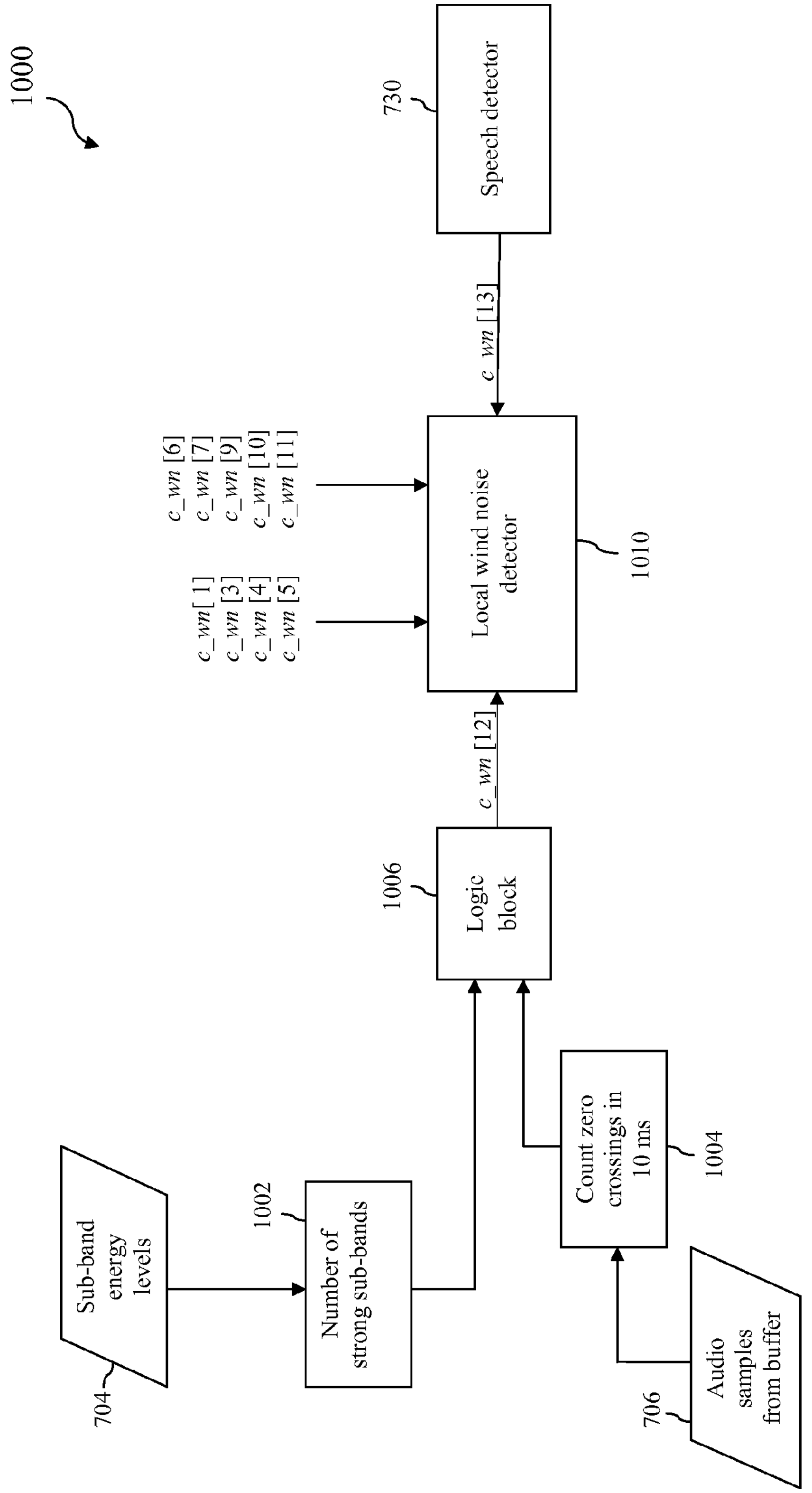
FIG. 10 is a block diagram of a system for performing local wind noise detection in accordance with an embodiment of the present invention.

E. Local Wind Noise Detection in Accordance with an Embodiment of the Present Invention FIG. 10 is a block diagram of an example system 1000 for performing local wind noise detection in accordance with an embodiment of the present invention. System 1000 may be used in a wind noise suppressor to perform step 418 of flowchart 400, as described above in reference to FIG. 4. System 1000 is described herein by way of example only. Persons skilled in the relevant art(s) will appreciate that other systems may be used to perform local wind noise detection.

System 1000 includes a local wind noise detector 1010. Local wind noise detector 1010 receives a plurality of binary values and then, based on such values, determines whether or not a frame of an input audio signal comprises wind noise only or comprises speech and wind noise. As shown in FIG. 10, local wind noise detector receives as input a number of binary values that are also received by global wind noise detector 740 as described above in reference to system 700 of FIG. 7. In one implementation, these binary values may be generated by the same logic for each of global wind noise detector 740 and local wind noise detector 1010, thereby reducing the amount of code necessary to implement the wind noise suppressor and improving processing efficiency.

As also shown in FIG. 10, local wind noise detector 1010 also receives binary value c_wn [13] from speech detector 730. The manner in which the binary value c_wn [13] is set by speech detector 730 was previously described.

As further shown in FIG. 10, system 1000 includes logic blocks 1002, 1004 and 1006, the operation of which will now be described. Logic block 1002 receives sub-band frequency energy levels 704 and identifies the number of strong frequency sub-bands based on the received information in a like manner to logic block 712 of system 700, as described above in reference to FIG. 7. Logic block 1004 receives a series of audio samples 706 from a buffer that represents a previous 10 milliseconds (ms) segment of the input audio signal and, based on audio samples 706, determines a number of times that a time domain representation of the audio signal segment crosses a zero magnitude axis in a like manner to logic block 728 of system 700, as described above in reference to FIG. 7. Logic block 1006 receives the number of strong frequency sub-bands (e.g., above 3 kHz) from logic block 1002 and the number of zero crossings from logic block 1004 and based on this information, sets a binary value c_wn [12] to "1" if these parameters suggest that a frame is a wind noise frame. For example, in one implementation, logic block 1006 sets c_wn [12] to "1" if the number of strong frequency sub-bands in the higher spectrum is less than a predefined threshold (e.g., zero, or no strong frequency sub-bands in the higher spectrum) and the number of zero crossings is less than another predefined threshold (e.g., 12 crossings in a 10 msec frame).

Figure 11:
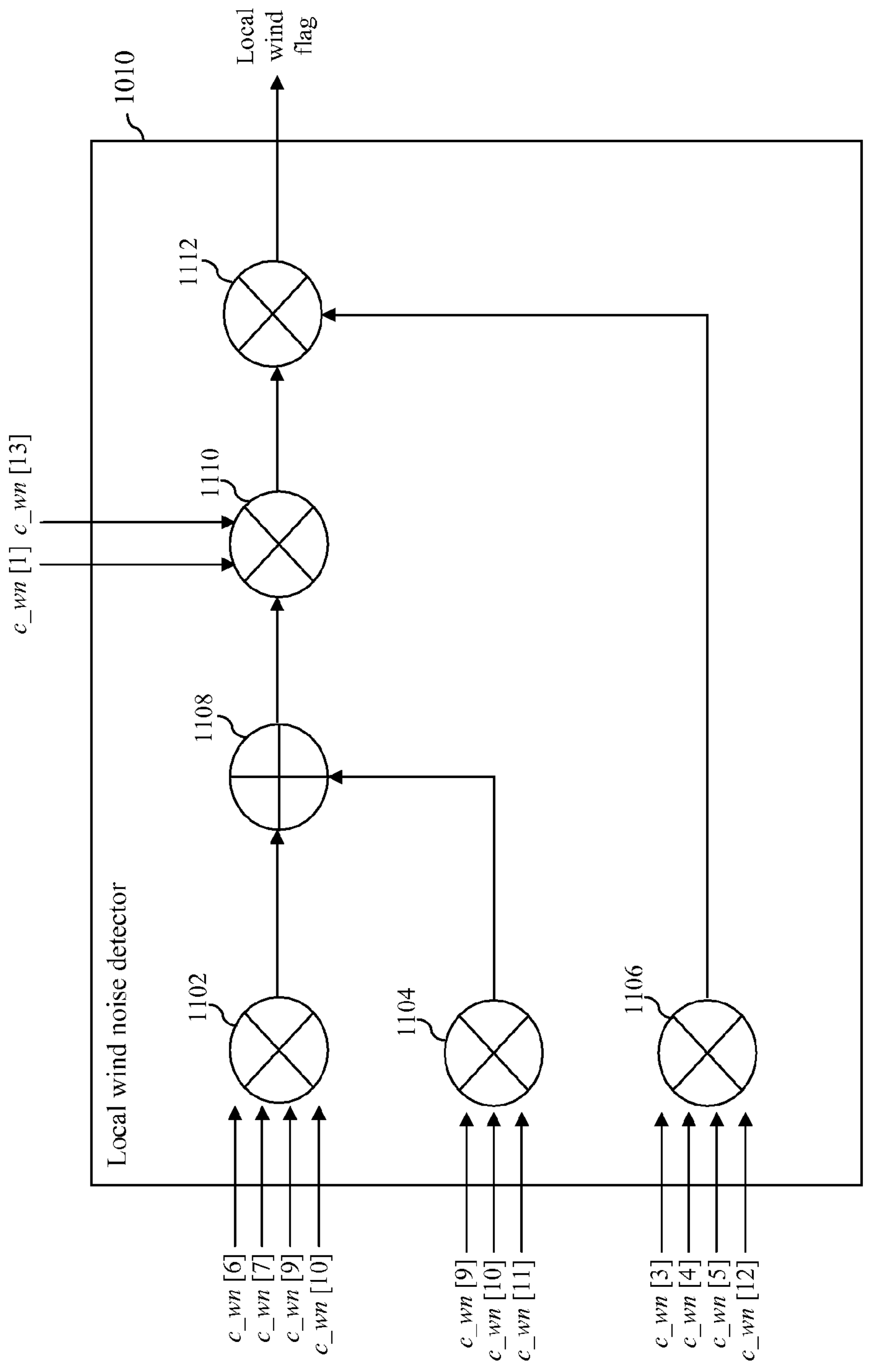
FIG. 11 is a block diagram of a local wind noise detector in accordance with an embodiment of the present invention.

FIG. 11 is a block diagram of local wind noise detector 1010 in accordance with one embodiment of the present invention. As shown in FIG. 11, local wind noise detector 1010 receives as inputs the binary values c_wn [1], c_wn [3], c_wn [4], c_wn [5], c_wn [6], c_wn [7], c_wn [9], c_wn [10], c_wn [11], c_wn [12] and c_wn [13] as produced by logic blocks described above in reference to system 700 of FIG. 7 and system 1000 of FIG. 10 and outputs a flag indicating whether or not a frame has been deemed a wind noise only frame or a speech and wind noise frame. The operation of the elements within local wind noise detector 1010 as shown in FIG. 11 will now be described.

A logic element 1102 performs a logical "AND" operation on the binary values c_wn [6], c_wn [7], c_wn [9] and c_wn [10] such that logic element 1102 will only produce a "1" if each of c_wn [6], c_wn [7], c_wn [9] and c_wn [10] is equal to "1".

A logic element 1104 performs a logical "AND" operation on the binary values c_wn [9], c_wn [10] and c_wn [11] such that logic element 1104 will only produce a "1" if each of c_wn [9], c_wn [10] and c_wn [11] is equal to "1".

A logic element 1108 performs a logical "OR" operation on the output of logic element 1102 and the output of logic element 1104 such that logic element 1108 will produce a "1" if the output of logic element 1102 or the output of logic element 1104 is equal to "1".

A logic element 1110 performs a logical "AND" operation on the binary value c_wn [1], the binary value c_wn [13] and the output of logic element 1108 such that logic element 1110 will only produce a "1" if each of c_wn [1], c_wn [13] and the output of logic element 1108 are equal to "1".

A logic element 1106 performs a logical "AND" operation on the binary values c_wn [3], c_wn [4], c_wn [5] and c_wn [12] such that logic element 1106 will only produce a "1" if each of c_wn [3], c_wn [4], c_wn [5] and c_wn [12] is equal to "1".

A logic element 1112 performs a logical "AND" operation on the output of logic element 1110 and the output of logic element 1106 such that logic element 1112 will only produce a "1" if both the output of logic element 1110 and the output of logic element 1106 are equal to "1". If the output of logic element 1112 is a "1" then this means that a wind noise only frame has been detected by local wind noise detector 1010. If the output of logic element 1112 is a "0" then this means that a speech and wind noise frame has been detected. The output of logic element 1112 is denoted "local wind flag" in FIG. 11.

F. Example Computer System Implementation

Each of the elements of the various systems depicted in FIGS. 2, 3, 7, 8, 9, 10 and 11 and each of the steps of flowchart depicted in FIG. 4 may be implemented by one or more processor-based computer systems. An example of such a computer system 1200 is depicted in FIG. 12.

Figure 12:
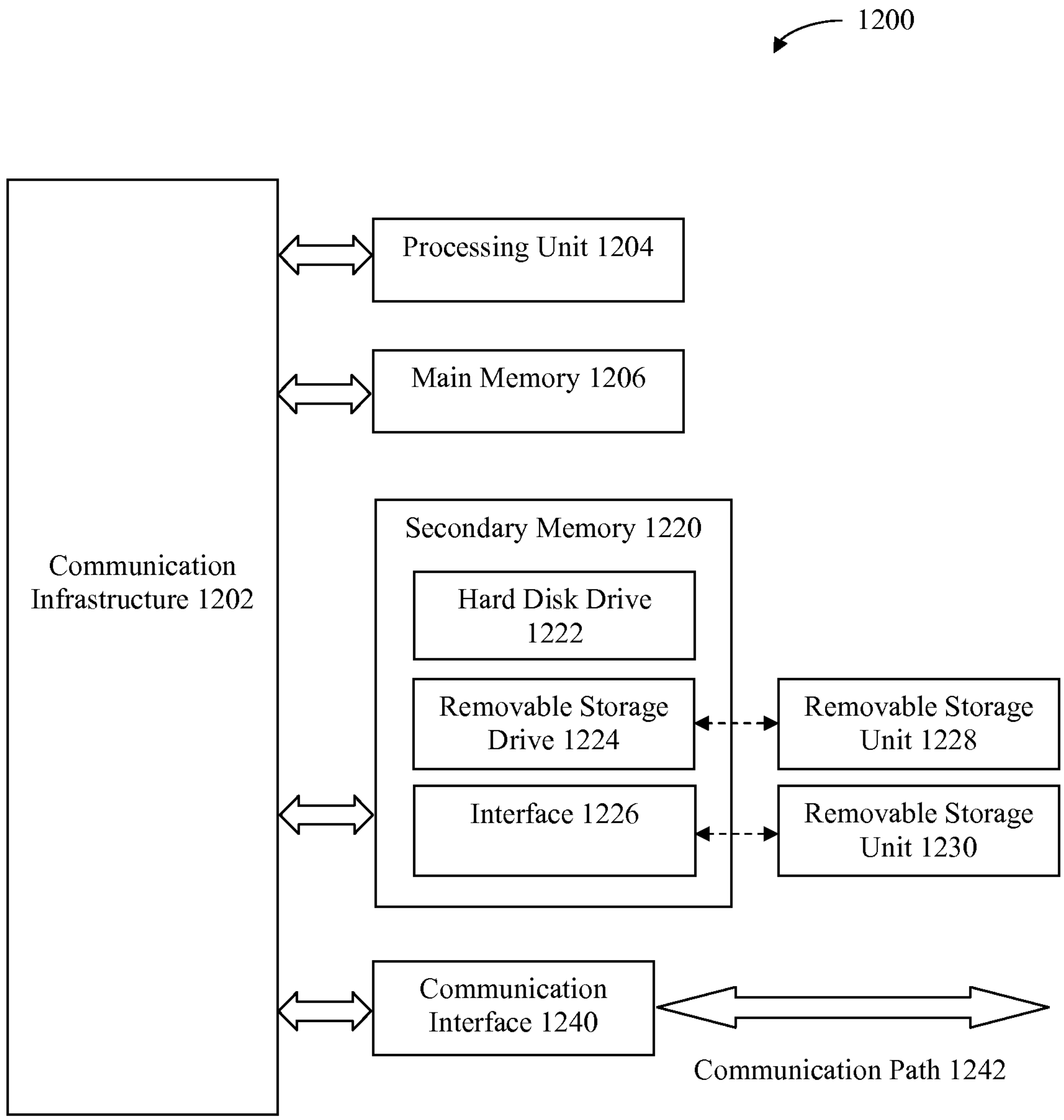
FIG. 12 is a block diagram of an example computer system that may be used to implement aspects of the present invention.

As shown in FIG. 12, computer system 1200 includes a processing unit 1204 that includes one or more processors. Processor unit 1204 is connected to a communication infrastructure 1202, which may comprise, for example, a bus or a network.

Computer system 1200 also includes a main memory 1206, preferably random access memory (RAM), and may also include a secondary memory 1220. Secondary memory 1220 may include, for example, a hard disk drive 1222, a removable storage drive 1224, and/or a memory stick. Removable storage drive 1224 may comprise a floppy disk drive, a magnetic tape drive, an optical disk drive, a flash memory, or the like. Removable storage drive 1224 reads from and/or writes to a removable storage unit 1228 in a well-known manner. Removable storage unit 1228 may comprise a floppy disk, magnetic tape, optical disk, or the like, which is read by and written to by removable storage drive 1224. As will be appreciated by persons skilled in the relevant art(s), removable storage unit 1228 includes a computer usable storage medium having stored therein computer software and/or data.

In alternative implementations, secondary memory 1220 may include other similar means for allowing computer programs or other instructions to be loaded into computer system 1200. Such means may include, for example, a removable storage unit 1230 and an interface 1226. Examples of such means may include a program cartridge and cartridge interface (such as that found in video game devices), a removable memory chip (such as an EPROM, or PROM) and associated socket, and other removable storage units 1230 and interfaces 1226 which allow software and data to be transferred from the removable storage unit 1230 to computer system 1200.

Computer system 1200 may also include a communication interface 1240. Communication interface 1240 allows software and data to be transferred between computer system 1200 and external devices. Examples of communication interface 1240 may include a modem, a network interface (such as an Ethernet card), a communications port, a PCMCIA slot and card, or the like. Software and data transferred via communication interface 1240 are in the form of signals which may be electronic, electromagnetic, optical, or other signals capable of being received by communication interface 1240. These signals are provided to communication interface 1240 via a communication path 1242. Communications path 1242 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 1228, removable storage unit 1230 and a hard disk installed in hard disk drive 1222. Computer program medium and computer readable medium can also refer to memories, such as main memory 1206 and secondary memory 1220, which can be semiconductor devices (e.g., DRAMs, etc.). These computer program products are means for providing software to computer system 1200.

Computer programs (also called computer control logic, programming logic, or logic) are stored in main memory 1206 and/or secondary memory 1220. Computer programs may also be received via communication interface 1240. Such computer programs, when executed, enable the computer system 1200 to implement features of the present invention as discussed herein. Accordingly, such computer programs represent controllers of the computer system 1200. Where the invention is implemented using software, the software may be stored in a computer program product and loaded into computer system 1200 using removable storage drive 1224, interface 1226, or communication interface 1240.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for suppressing non-stationary noise in an audio signal, comprising:
   - analyzing a series of frames of the audio signal to detect whether the audio signal comprises non-stationary noise; and
   - responsive to detecting that the audio signal comprises non-stationary noise,
   - determining whether a frame of the audio signal comprises non-stationary noise or speech and non-stationary noise,
   - applying a first filter to the frame responsive to determining that the frame comprises non-stationary noise, and
   - applying a second filter to the frame responsive to determining that the frame of the input audio signal comprises speech and non-stationary noise.

2. The method of claim 1, wherein the non-stationary noise comprises wind noise.

3. The method of claim 1, wherein analyzing the series of frames of the audio signal to detect whether the audio signal comprises non-stationary noise comprises:
   - determining whether each frame in the series of frames is a non-stationary noise frame.

4. The method of claim 3, wherein analyzing the series of frames of the audio signal to detect whether the audio signal comprises non-stationary noise further comprises:
   - determining if the total number of non-stationary noise frames in the series of frames exceeds a threshold.

5. The method of claim 3, wherein analyzing the series of frames of the audio signal to detect whether the audio signal comprises non-stationary noise further comprises:
   - determining whether a long term average of the energy of a plurality of non-stationary noise frames exceeds a threshold.

6. The method of claim 3, wherein determining whether each frame in the series of frames is a non-stationary noise frame comprises performing a combination of tests, wherein performing each test includes comparing one or more time and/or frequency characteristics of the audio signal to one or more time and/or frequency characteristics of the non-stationary noise.

7. The method of claim 6, wherein performing the combination of tests comprises performing two or more of:
   - determining a total number of strong frequency sub-bands associated with a frame;
   - determining if one or more strong frequency sub-bands associated with a frame occur within a group of the lowest frequency sub-bands associated with the frame;
   - performing a least squares analysis to fit a series of frequency sub-band energy levels associated with a frame to a linearly sloping downward line;
   - determining a number of times that a time domain representation of a segment of the audio signal crosses a zero magnitude axis;
   - calculating a difference between an energy level associated with a first strong frequency sub-band associated with a frame and a last strong frequency sub-band associated with the frame;
   - determining if a spectral energy shape associated with a frame is monotonically decreasing;
   - determining if a minimum number of strong frequency sub-bands associated with a frame occur in a group of low-frequency sub-bands and a minimum number of strong frequency sub-bands associated with the frame occur in a group of high-frequency sub-bands;
   - calculating a ratio between a highest energy level associated with a frequency sub-band of a frame and a sum of energy levels associated with other frequency sub-bands of the frame; and
   - correlating frequency transform values in a plurality of frequency sub-bands associated with the audio signal over time.

8. The method of claim 1, wherein determining whether a frame of the audio signal comprises non-stationary noise or speech and non-stationary noise comprises:
   - performing a combination of tests, wherein performing each test includes comparing one or more time and/or frequency characteristics of the audio signal to one or more time and/or frequency characteristics of the non-stationary noise.

9. The method of claim 8, wherein performing the combination of tests comprises performing two or more of:
   - determining a total number of strong frequency sub-bands associated with the frame;
   - determining if one or more strong frequency sub-bands associated with the frame occur within a group of the lowest frequency sub-bands associated with the frame;
   - performing a least squares analysis to fit a series of frequency sub-band energy levels associated with the frame to a linearly sloping downward line;
   - determining a number of times that a time domain representation of a segment of the audio signal crosses a zero magnitude axis;

calculating a difference between an energy level associated with a first strong frequency sub-band associated with the frame and a last strong frequency sub-band associated with the frame;

determining if a spectral energy shape associated with the frame is monotonically decreasing;

determining if a minimum number of strong frequency sub-bands associated with the frame occur in a group of low-frequency sub-bands and a minimum number of strong frequency sub-bands associated with the frame occur in a group of high-frequency sub-bands;

calculating a ratio between a highest energy level associated with a frequency sub-band of the frame and a sum of energy levels associated with other frequency sub-bands of the frame; and correlating frequency transform values in a plurality of frequency sub-bands associated with the audio signal over time.

10. The method of claim 1, wherein applying the first filter to the frame comprises applying a fixed amount of attenuation to each of a plurality of frequency sub-bands associated with the frame.

11. The method of claim 10, wherein applying the fixed amount of attenuation to each of the plurality of frequency sub-bands associated with the frame comprises:

applying a flat attenuation to each of the plurality of frequency sub-bands associated with the frame.

12. The method of claim 1, wherein applying the second filter to the frame comprises applying a high-pass filter to the frame.

13. The method of claim 12, wherein applying the high-pass filter to the frame comprises:

selecting the high-pass filter from a table of high-pass filters wherein the high-pass filter is selected based at least on an estimated energy of the non-stationary noise.

14. The method of claim 12, wherein applying the high-pass filter to the frame comprises:

applying a parameterized high-pass filter to the frame, wherein one or more parameters of the parameterized high pass filter are calculated based at least on an estimated energy of the non-stationary noise.

15. A method for suppressing non-stationary noise in an audio signal, comprising:

determining whether each frame in a series of frames of the audio signal is a non-stationary noise frame, wherein determining whether a frame is a non-stationary noise frame comprises performing a combination of tests and wherein performing each test includes comparing one or more time and/or frequency characteristics of the audio signal to one or more time and/or frequency characteristics of the non-stationary noise; and applying non-stationary noise suppression to each frame in the series of frames that is determined to be a non-stationary noise frame;

wherein performing the combination of tests comprises performing two or more of:

determining a total number of strong frequency sub-bands associated with a frame;

determining if one or more strong frequency sub-bands associated with a frame occur within a group of the lowest frequency sub-bands associated with the frame;

performing a least squares analysis to fit a series of frequency sub-band energy levels associated with a frame to a linearly sloping downward line;

determining a number of times that a time domain representation of a segment of the audio signal crosses a zero magnitude axis;

calculating a difference between an energy level associated with a first strong frequency sub-band associated with a frame and a last strong frequency sub-band associated with the frame;

determining if a spectral energy shape associated with a frame is monotonically decreasing;

determining if a minimum number of strong frequency sub-bands associated with a frame occur in a group of low-frequency sub-bands and a minimum number of strong frequency sub-bands associated with the frame occur in a group of high-frequency sub-bands;

calculating a ratio between a highest energy level associated with a frequency sub-band of a frame and a sum of energy levels associated with other frequency sub-bands of the frame; and correlating frequency transform values in a plurality of frequency sub-bands associated with the audio signal over time.

16. The method of claim 15, wherein the non-stationary noise comprises wind noise.

17. The method of claim 15, further comprising:

determining the one or more time and/or frequency characteristics associated with the audio signal based on one or more of:

a set of signal-to-noise ratios (SNRs) corresponding to a plurality of frequency sub-bands of the frame; and a set of energy levels corresponding to the plurality of frequency sub-bands of the frame.

18. The method of claim 17, further comprising:

receiving the set of SNRs and/or the set of energy levels from an acoustic noise suppressor.

19. A method for suppressing non-stationary noise in an audio signal, comprising:

determining whether a frame of the audio signal comprises non-stationary noise or speech and non-stationary noise;

applying a first filter to the frame responsive to determining that the frame comprises non-stationary noise; and applying a second filter to the frame responsive to determining that the frame comprises speech and non-stationary noise.

20. The method of claim 19, wherein the non-stationary noise comprises wind noise.

21. The method of claim 19, wherein determining whether the frame of the audio signal comprises non-stationary noise or speech and non-stationary noise comprises performing a combination of tests, wherein performing each test includes comparing one or more time and/or frequency characteristics of the audio signal to one or more time and/or frequency characteristics of the non-stationary noise.

22. The method of claim 21, wherein performing the combination of tests comprises performing two or more of:

determining a total number of strong frequency sub-bands associated with the frame;

determining if one or more strong frequency sub-bands associated with the frame occur within a group of the lowest frequency sub-bands associated with the frame;

performing a least squares analysis to fit a series of frequency sub-band energy levels associated with the frame to a linearly sloping downward line;

determining a number of times that a time domain representation of a segment of the audio signal crosses a zero magnitude axis;

calculating a difference between an energy level associated with a first strong frequency sub-band associated with the frame and a last strong frequency sub-band associated with the frame;

determining if a spectral energy shape associated with the frame is monotonically decreasing;

determining if a minimum number of strong frequency sub-bands associated with the frame occur in a group of low-frequency sub-bands and a minimum number of strong frequency sub-bands associated with the frame occur in a group of high-frequency sub-bands;

calculating a ratio between a highest energy level associated with a frequency sub-band of the frame and a sum of energy levels associated with other frequency sub-bands of the frame; and correlating frequency transform values in a plurality of frequency sub-bands associated with the audio signal over time.

23. The method of claim 19, wherein applying the first filter to the frame comprises applying a fixed amount of attenuation to each of a plurality of frequency sub-bands associated with the frame.

24. The method of claim 23, wherein applying the fixed amount of attenuation to each of the plurality of frequency sub-bands associated with the frame comprises:

applying a flat attenuation to each of the plurality of frequency sub-bands associated with the frame.

25. The method of claim 19, wherein applying the second filter to the frame comprises applying a high-pass filter to the frame.

26. The method of claim 25, wherein applying the high-pass filter to the frame comprises:

selecting the high-pass filter from a table of high-pass filters wherein the high-pass filter is selected based at least on an estimated energy of the non-stationary noise.

27. The method of claim 25, wherein applying the high-pass filter to the frame comprises:

applying a parameterized high-pass filter to the frame, wherein one or more parameters of the parameterized high pass filter are calculated based at least on an estimated energy of the non-stationary noise.

28. The method of claim 18, wherein the acoustic noise suppressor includes one or more of a wind noise suppressor, a background noise suppressor, and an echo canceller.

* * * * *